United States Patent [19]
Thompson

[11] Patent Number: 6,058,881
[45] Date of Patent: May 9, 2000

[54] DEMAND WATERING VALVE FOR FOWL, BIRDS AND SMALL ANIMALS

[76] Inventor: Earl C. Thompson, 448 S. First St., Hewitt, Tex. 76643-3440

[21] Appl. No.: 08/996,527

[22] Filed: Dec. 23, 1997

Related U.S. Application Data

[63] Continuation-in-part of application No. 08/745,694, Nov. 12, 1996.

[51] Int. Cl.$^7$ ...................................................... A01K 7/06
[52] U.S. Cl. ........................................................ 119/72.5
[58] Field of Search .............................. 119/72.5; 251/84, 251/336, 349

[56] References Cited

U.S. PATENT DOCUMENTS

| | | | |
|---|---|---|---|
| 3,698,685 | 10/1972 | Lang | 119/72.5 |
| 4,402,343 | 9/1983 | Thompson et al. | 119/72.5 |
| 4,637,345 | 1/1987 | Hostetler | 119/72.5 |
| 4,908,884 | 3/1990 | John et al. | 251/394 |
| 4,984,537 | 1/1991 | Steudler, Jr. | 119/72.5 |
| 5,131,622 | 7/1992 | Chang | 119/27.5 |
| 5,358,216 | 10/1994 | Jang | 251/336 |
| 5,427,058 | 6/1995 | Chung | 119/72.5 |
| 5,522,346 | 6/1996 | Clark, IV | 119/72.5 |

Primary Examiner—Peter M. Poon
Assistant Examiner—Elizabeth Shaw
Attorney, Agent, or Firm—Daniel Rubin

[57] ABSTRACT

A demand type watering valve for the watering of birds and small animals in which the output water quantity varies with the level of input force imposed by the seeker of water. A spring biased metering pin extends upwardly in a body passage to the water inlet while a tubular actuator stem extends downwardly dependent in the body passage from an upper engagement with the metering pin to an accessible length beyond the termination of said body. In response to a light demand force, the actuator stem is displaced to rock sideways and permit limited water entry for the water to enter internally of said stem while a greater demand force causes a greater stem displacement to permit concomitant parallel water flow about the exterior of said stem.

26 Claims, 6 Drawing Sheets

DEMAND WATERING VALVE FOR FOWL, BIRDS AND SMALL ANIMALS

This application is a continuation in-part of application Ser. No. 08/745,694 filed Nov. 12, 1996.

FIELD OF THE INVENTION

The field of art to which the invention pertains comprises the art of force actuated valves for watering birds and small animals.

BACKGROUND OF THE INVENTION

A chicken is approximately eighty percent water. A broiler chicken, for example, will typically increase its birth weight four fold in seven days and weigh four pounds in forty two days. Fresh clean water is therefore vital in the growing of poultry. Chicken life, on the otherhand, begins when hatched, and at one day it can see, talk, stand, walk and knows to seek food. After customary debeaking however, sight becomes the primary sense for the finding of food. The yolk typically will sustain the chick for 5–7 days. Allowing 1–3 days for hatching and hauling, the bird must then begin to eat and drink but will usually not eat without an ample supply of water. It is therefore vital that the bird quickly find water to avoid both starvation and achieve maximum gain. Broilers eventually attain a six pound weight, while a turkey hen reaches mineteen pounds and a tom turkey reaches thirty-four pounds.

In recent years, dispensing of fresh water to fowl or small animals has increasingly been provided by the use of demand actuated water dispensers directly connected to a fresh water supply. The dispenser typically comprises a valve connected in a secured relation to a water supply line and formed of a corrosion resistant composition such as plastic or a selected metal. Included in the valve is a displacable valve actuator in the form of a spring biased elongated stem extending beyond the valve body at its distal end to within beak reach of the poultry. Individual birds wanting to drink, peck at the valve stem in opposition to a light spring force enabling fresh water to be automatically dispensed. When drinking is completed, the stem is released and the spring force reverts the stem to its cutoff relation. Water pressure typically is varied from about 1.33 oz. during the first week of life to 2.66 oz. during the second week to 9.24 oz. at 4–5 weeks.

For varying the flow rate being dispensed when the valve is actuated, it has been known to utilize various interchangeable devices such as disclosed, for example, in U.S. Pat. No. 4,370,948. Exemplifying demand type animal watering devices of the prior art are the disclosures of U.S. Pat. Nos. 2,939,424; 3,777,714; 3,698,431; 4,187,804; 4,370,948; 4,416,221; 4,491,088; 4,573,433 and 5,003,927.

It is known therefore to achieve different outputs from the dispenser by altering mechanical operating structures thereof. However, it is recognized that even poultry requirements vary from the smaller bird, that pecks lightly on the dispenser for a minimal demand, to a larger bird that pecks more severely for an increased demand. Pecking by larger birds is known to impose vibration that causes dispensing irregularities. Smaller animals and their young will similarly affect the output of such dispensers.

Despite recognition of the foregoing, it has not heretofore been known to provide a single dispenser that affords a range of output in a correlated response to the demand force imposed on the dispenser actuator. At the same time, it has not been known heretofore how to adequately prompt the new born chick to initiate use of such dispensers.

OBJECTS OF THE INVENTION

It is an object of the invention to provide a novel construction for a demand-type dispenser for watering fowl and small animals.

It is a further object of the invention to effect the previous object with a construction that is variably responsive through a demand range between the younger and older of the species such as birds, poultry and/or small animals.

It is a yet further object of the invention to effect the foregoing objects with a valve construction that is highly economical to both fabricate and operate so as to remain marketably competitive with demand type dispenser valves of the prior art.

It is a still further object of the invention to achieve the above objects utilizing an inherent attractant for the birds.

SUMMARY OF THE INVENTION

This invention relates to demand type watering devices for birds, poultry and small animals. More specifically, the invention relates to watering dispensers of the demand type having a range of output for dispensing more or less water in correlation to the level of demand force imposed thereon.

The foregoing is achieved in accordance with a first embodiment of the invention utilizing a tubular body having side wings for mounting directly to a water pipe under very low pressure. Within the body is a spring biased elongated metering pin that serves to restrict the allowable input flow. The pin is supported in an upper body bore and extends from a semi rounded head at its lower end upwardly outward to within the pipe when installed. The pin head engages a relatively flat head of a tubular actuator stem normally seated in a lower body bore against an annular seal surrounding the bore outlet. The actuator stem is displaceable and depends to an exposed relation beyond the distal end of the outlet within beak or mouth reach of individual birds to be watered. A force as low as ¼ oz. applied against the distal end by a one day old chick will operate the valve.

The stem is closed at its top end and included are a plurality of side apertures and/or slots at a location below the seal through which water flow can enter when the stem is displaced either sideway or upwardly in a rocker-like motion. In this manner, a small peck by a small chick will impose a minimum displacement of the stem enabling water to be dispensed entirely into and through the stem for minimum flow. A harder more severe peck or push from a relatively larger bird or animal will impose greater displacement of the stem enabling the water quantity to exceed the aperture capacity to receive and therefore concomitantly permit parallel or dual flow outward about the stem. With parallel flow within and without the stem, a greater total flow is effected.

By use of a buffer ring within the body at or near the stem end, flow when stopped, remains trapped within the body bore and affords a cleansing action. In this manner, minimal overflow of unconsumed water occurs that could otherwise drop into the litter and mess. At the same time, the buffer ring aids in directing flow into the side apertures of the stem. A rotatable buffer ring may optionally be included on the exposed end of the actuator stem so that the ring rather than the stem incurs arcuate displacement induced by a twisting force imposed by the bird or animal. This enables seal wear to be significantly reduced.

In a second embodiment, the metering pin includes a smooth flat head engageable against the top surface of an O-ring or a centrally apertured flat washer that in turn engages the top surface of a totally tubular actuator stem. Sideway rocking displacement of the actuator stem by as much as 360 degrees by thirsty birds sequentially dispenses water flow in a parallel relation both through and past the stem head.

In a third embodiment, a round headed metering pin engages the entry to a seal faced head of a tubular actuator stem. Sideway rocking 360 degree displacement of the actuator stem initiates sequential parallel dispensing first through and then also about the head of the actuator stem.

In a fourth embodiment, a semi-spherical seal on the top face of the tubular actuator stem receives a spherical ball interveningly engaged by the head face of the metering pin and the head face of the actuator stem. The head of the metering pin is urged against the ball by a frusto-conically configured spring. Alternatively, the metering pin is omitted and the ball is urged against a tubular seal positioned about the bored head of the actuator stem.

The above noted features and advantages of the invention as well as other superior aspects thereof, will be further appreciated by those skilled in the art upon reading the detailed description which follows in conjunction with the drawings.

DESCRIPTION OF THE PREFERRED EMBODIMENT

In the description which follows, like parts are marked throughout the specification and drawings with the same reference numerals respectively. The drawing figures are not necessarily to scale and in certain views, parts may have been exaggerated for purposes of clarity.

Figure 1:
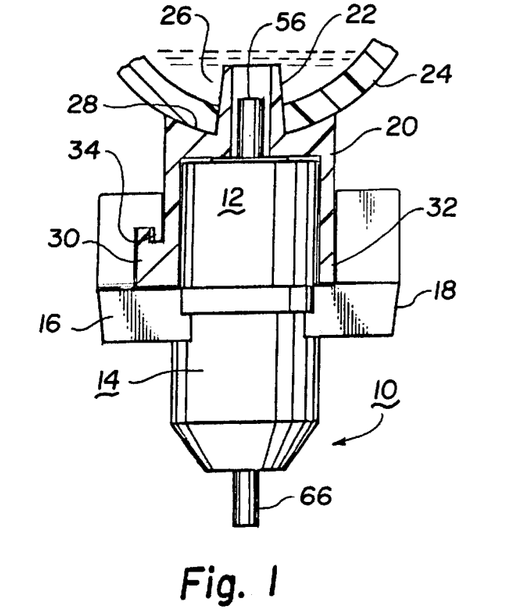
FIG. 1 is an exterior elevation view partially sectioned of a first embodiment dispensing valve hereof in its installed and closed relation.
Figures 2, 2A:
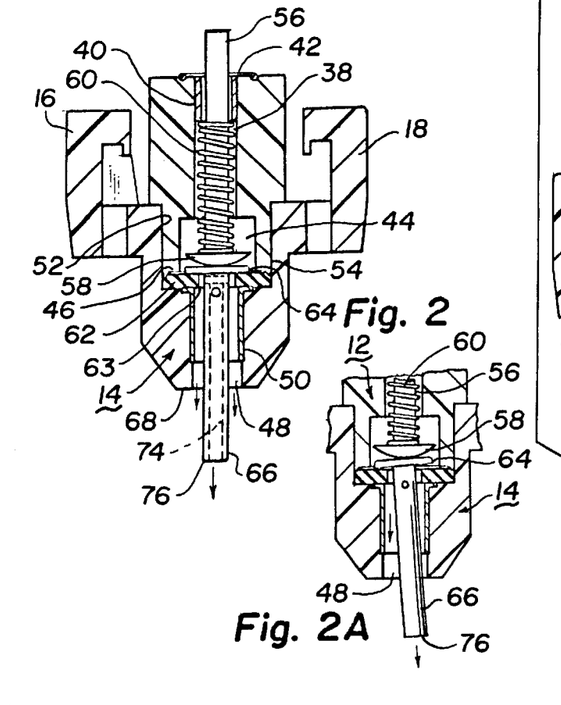
FIG. 2 is an elevation sectional view of the dispensing valve of FIG. 1.
FIG. 2A is a fragmentary sectional view of the valve of FIG. 1 in its open relation.
Figure 3:
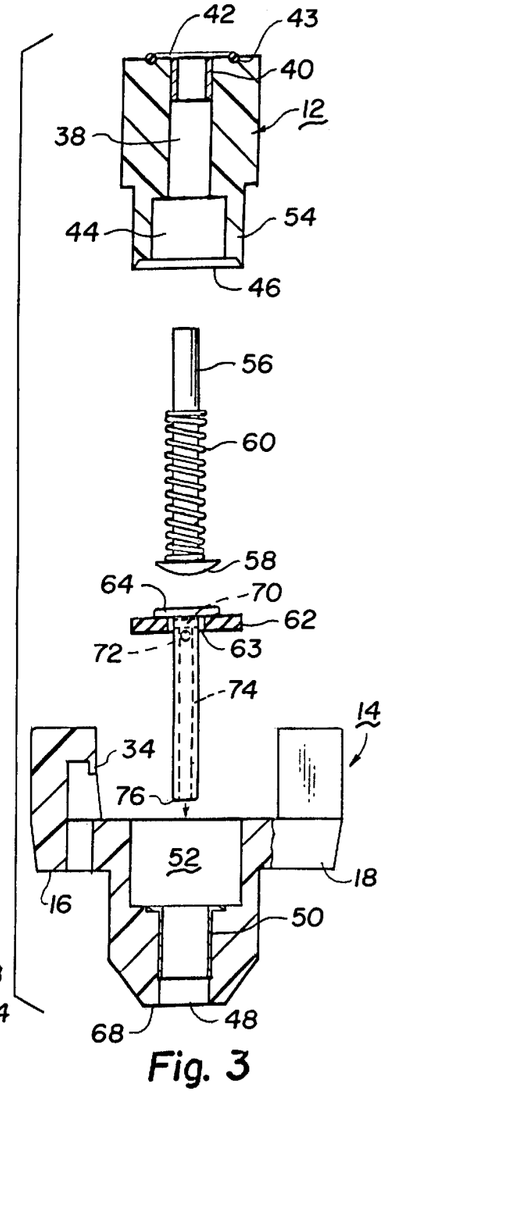
FIG. 3 is an exploded elevation of the various components comprising the dispensing valve of FIG. 1.

Referring now to drawing FIGS. 1–3, there is illustrated a first embodiment of the demand operative dispensing valve hereof designated 10. The valve is comprised of an upper body 12 that interfits with a lower body 14. The latter includes one or more hook side arms 18 for mounting onto a saddle 20 secured in turn through an aperture 22 of a water pipe 24. Arms 16 are optionally solid to minimize breakoff from the possibility of excessive force being applied. Both upper body 12 and lower body 14 are preferably formed of a suitable synthetic plastic composition such as polycarbonate or ABS Riera Plas. They may also consist of a coated or contained visibly bright colored attractant, as will be described. Saddle 20 may be of PVC or similar plastic composition and includes an upper tubular neck 26 for extending into pipe aperture 22. Arcuate surfaces 28 adapt the saddle to be cemented or thermally welded firmly against the peripheral surface of the pipe. A complementary reinforced side hook 30 on the saddle enables mounting of lower body side arm 16 thereon via reverse distal bend 34. Hook 30 may also be solid on one side for added strength. This arrangement likewise enables older single hook valves to be utilized thereon.

Within upper body 12 there is provided an axial inlet bore 38 which includes a metal sleeve 40 surrounded on its end face by an annular gasket 42 seated in saddle recess 43. The underside of upper body 12 includes a counter-bore 44 merging with a relatively shallow terminal counter-bore 46 in which to receive gasket 62 having a central aperture 63. The seal, which could be an O-ring, is preferably formed of synthetic elastomeric materials or rubber suitable for a poultry environment. Lower body 14 includes an axially extending bore 48 that contains metal sleeve 50 and a counter-bore 52 for interfitting receipt of nose 54 of upper body 12.

Also within the upper body is positioned an elongated and displaceable metering pin 56 that upwardly extends to within upper open neck 26 of saddle 20. The pin defines a predetermined flow clearance therebetween while serving also to prevent sediment or trash from collecting about the opening. The lower end of pin 56 includes an arcuate rounded head 58 urged downwardly by compressed coil spring 60 that imposes a soft and relatively light spring action against the pin. The diameter of spring 60 is generally larger along its intermediate section than at either of its ends. This enables the larger centrally located coils to maintain the coaxial relation of the spring while the end coils embrace the metering pin. Alternatively, spring 60 can be smaller along its intermediate section and relatively larger at its ends.

Seated above gasket 62 in counter-bore 46 engaging the underside of head 58 of the metering pin is a flat head 64 of a head capped tubular actuator stem 66. The underside of stem head 64 seats against gasket 62 for the stem to extend downward through gasket aperture 63 and bore 48 to beyond the end face 68 of lower body 14. The underside of head 64 is also slightly angled to aid rocking when displaced and thereby reduce seal wear. Formed in stem 66 is an open cross bore 70 along with one or more angularly spaced apertures 72 through which water can enter the internal tube 74 for release through distal end 76 as will be explained. Preferably cross-bore 70 and apertures 72 are of the same diameter as the internal diameter of tube 74.

Figures 4, 5:
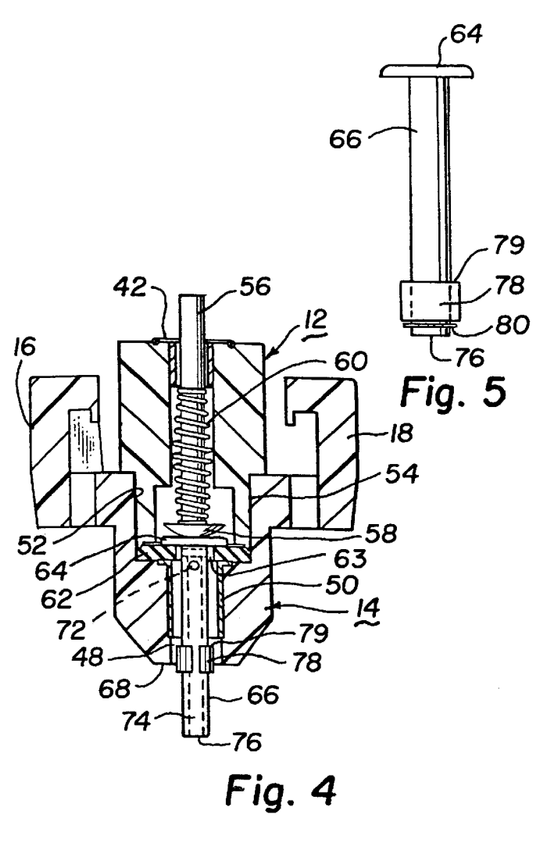
FIG. 4 is a sectional view similar to FIG. 2 for a modified form of the dispensing valve of FIG. 1.
FIGS. 5, 6, 7, 8 and 9 represent various modifications for the actuator stem of the valve in the embodiment of FIG. 1.

The modification of FIG. 4 differs from that just described in the use of a clamp type buffer ring 78 securely mounted on actuator stem 66 partially within the end of bore 48. The ring not only supplies a larger contact surface but also functions to vertically support surface water about its upper rim face 79. Excess flow quantity beyond the capacity of tube 74 to conduct will flow in parallel about the exterior surface of the actuator stem instead of entering the stem via bore 70 and aperture 72. This enables an additional quantity of water to flow in a dual flow relation concomitantly over the ring 78 in order to satisfy a higher demand of larger birds. At such time as water demand terminates, a defined quantity of water via surface tension will be retained in bore 48 above the end face 79 of ring 78. This affords a subsequent cleansing action while avoiding drip or splash that can tend to contaminate and mess any surrounding litter.

FIG. 5 illustrates an actuator stem 66 in which the buffer ring 78 is arcuately displaceable and secured against possible drop-off or pull off from the stem by a lock washer 80. The buffer ring 78 is relatively rotatable up to 360 degrees with respect to the actuator stem enabling it to incur arcuate displacement in response to any turning vector from an imposed twist pecking action of the birds or animals. Stem 66 in this embodiment is solid, rather than hollow, and with exterior flow only, is most suitable for one age birds such as grown hens.

Figure 6:
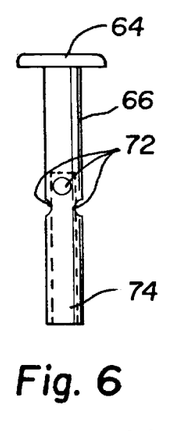

In FIG. 6, actuator stem 66 includes a total of four inlet apertures 72 communicating from the exterior surface of the actuator stem to inward of discharge tube 74 for dual flow as above. This affords up to 360 degree activation for enhanced flow outward of tube 74.

Figure 7:
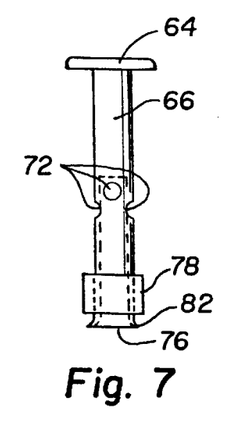

In FIG. 7, actuator stem 66 includes an angularly displaceable buffer ring 78 retained against dropoff or pull off loss by a flare 82 at stem end 76.

Figure 8:
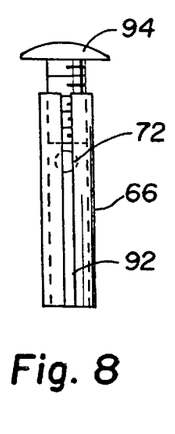

In FIG. 8, stem 66 is comprised of a ring key construction having a continuous vertical slot 92 along with an opposite side aperture 72. A screw or rivet 94 in this arrangement replaces the flat head 64 of the above construction. For round head screw or rivet 94, a flat headed metering pin 56 is preferred.

Figure 9:
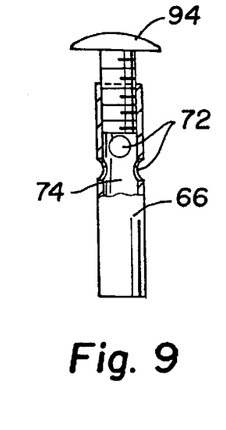

In FIG. 9, the actuator stem 66 is tubular as above and likewise includes a screw or rivet 94 as a replacement for head 64.

Figure 10:
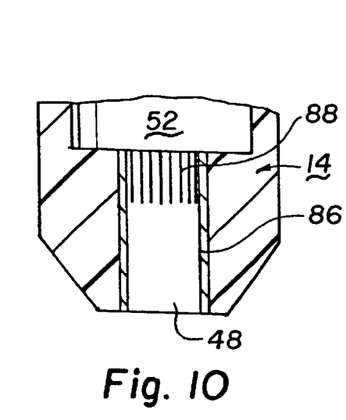
FIGS. 10, 11, and 12 illustrate modified forms of the lower body sleeve in the valve hereof.

In FIG. 10 previous sleeve 50 is replaced by a longer sleeve 86 that is co-extensive with body bore 48 and includes a knurled or splined surface 88 about its outer surface for gripping lower body 14.

Figure 11:
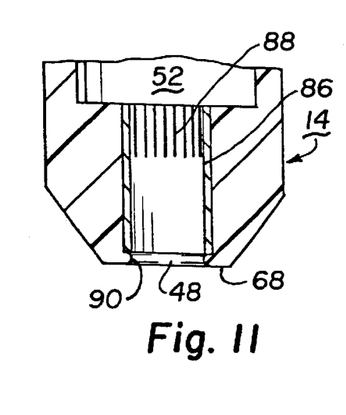

In FIG. 11, the distal end of sleeve 86 is supported by an annular plastic rib 90 that serves to prevent outward displacement of the sleeve.

Figure 12:
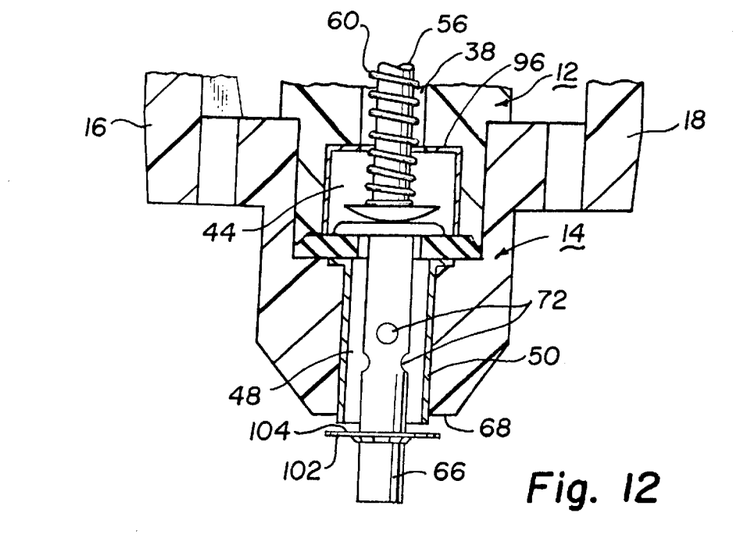

In the construction of FIG. 12, the lower distal end of sleeve 50 extends outward beyond body undersurface 68 in order to maintain water direction in the event the body incurs any wear-back over the course of time. Included in this arrangement is a liner 96 within counter-bore 44 so as to minimize wear thereat due to larger fowl or animals. Also included is a tinnerman nut 102 that is rigidly secured about stem 66. The nut serves a similar function as the buffer ring 78 in FIG. 4 while affording an increased horizontal face 104 for the vertical support of surface water on stem 66. This embodiment is primarily for larger birds like breeder hens and toms of about 32 lbs and turkey hens of about 20 lbs.

Figure 13:
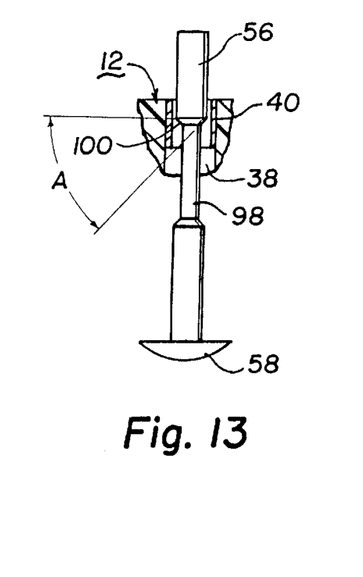
FIGS. 13 and 14 are modified forms of metering pin for the valve hereof.

In FIG. 13, the metering pin 56 includes a central section 98 of reduced diameter that includes a reducing or tapered chamfer 100. The chamfer angle "A" can be an approximately thirty degree angle for chickens and preferably about a forty-five degree angle for larger birds such as turkeys. By means thereof, upward displacement of metering pin 56 in the course of a lateral force being imposed on the actuator stem 66 will enable water to be released inward of bore 38 in relatively greater amounts by the larger angle for the larger birds such as turkeys.

Figure 14:
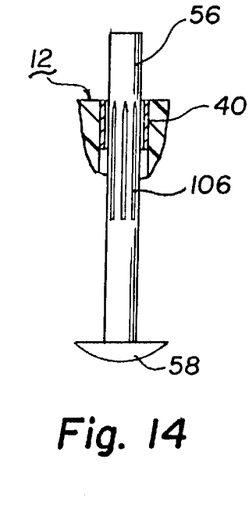

FIG. 14 illustrates a modified metering pin 56 containing a plurality of vertically rectilinear splines 106 uniformly spaced about its periphery. Like the construction of FIG. 13, the splines permit increased water flow as they are displaced upwardly above sleeve 40 in the course of operation.

Figure 15:
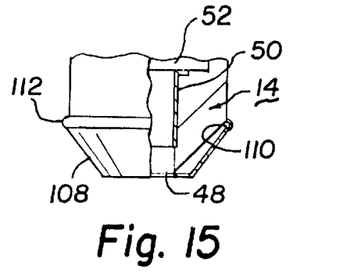
FIG. 15 is a fragmentary elevation of a modification for the dispensing end of the valve body.

FIG. 15 illustrates use of a protective metal guard cap 108 fitted onto the underend 68 of lower body 14. For these purposes, the body is provided with an annular bead 110 and the guard cap includes an annular recess 112 to effect a snap-on fit onto the bead. With cap 108 being utilized, sleeve 50 can optionally be eliminated.

Figure 16:
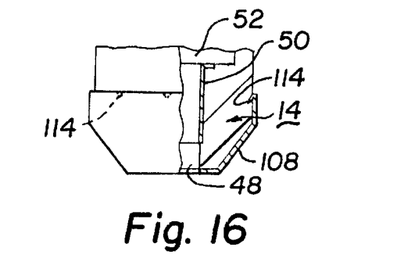
FIG. 16 is an alternative further modification of the body end of FIG. 15.

FIG. 16 is similar to FIG. 15 but utilizes a plurality of uniformly spaced burrs 114 for gripping the surface of body 14.

Figure 17:
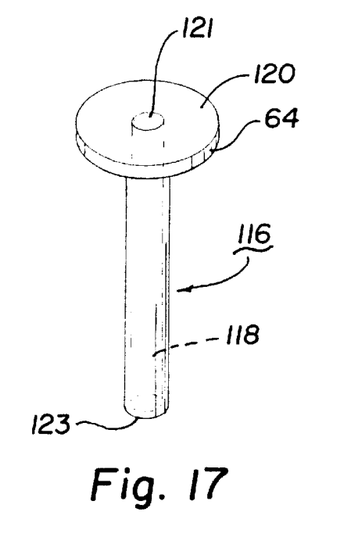
FIG. 17 is a perspective view of an actuator stem for the valve in a second embodiment hereof.
Figure 18:
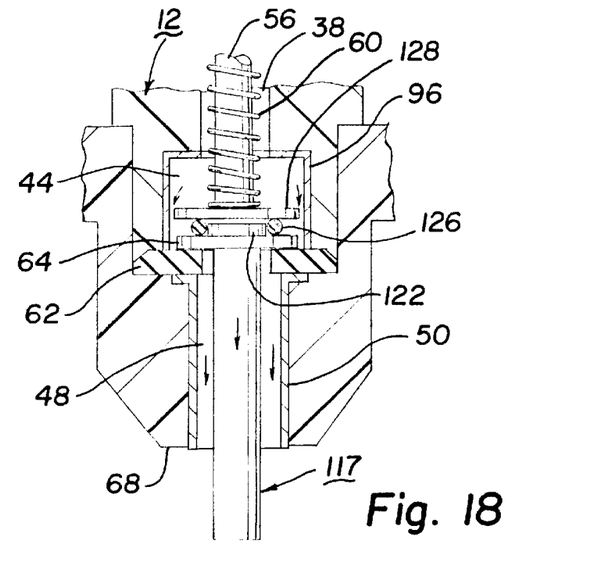
FIG. 18 is a fragmentary sectional elevation of a dispensing valve with the actuator stem of FIG. 18A.
Figure 18A:
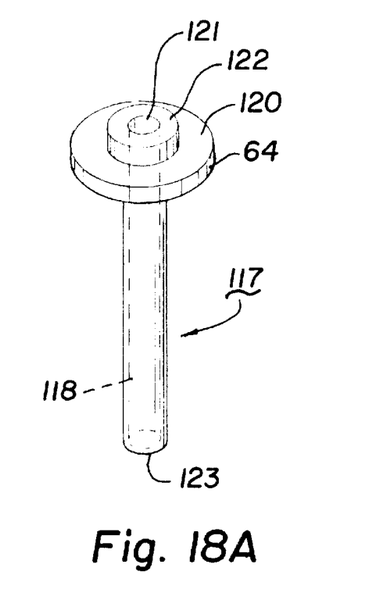
FIG. 18A is perspective view of an alternative acuator pin.
Figure 19:
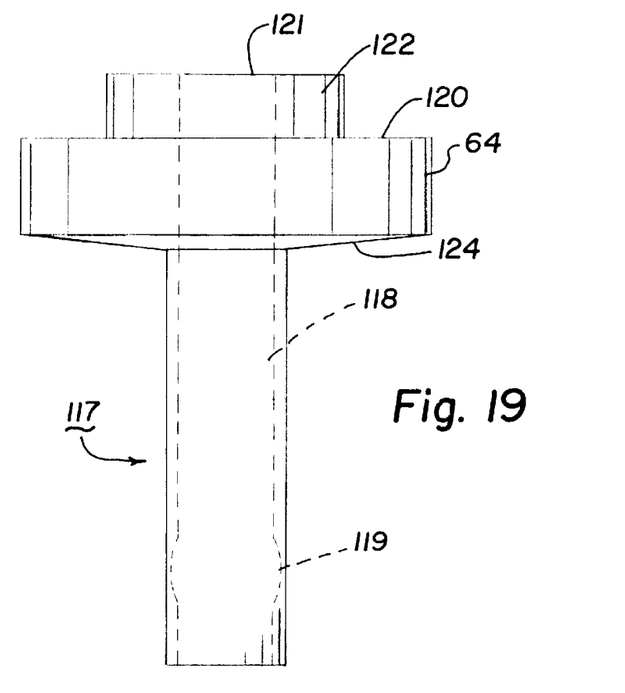
FIG. 19 is an enlarged side elevation of a modified actuator stem from that of FIG. 18A.

In the second embodiment hereof, shown in FIGS. 17–22, the actuator stem 116 includes a continuous internal tube 118 between opposite ends from an inlet 121 within head 64 to an outlet 123. In FIG. 17, top end 120 has a flat head 64 as before while in FIGS. 18A and 19, head 64 of actuator stem 117 includes an integral upstanding concentric shoulder or collar 122 defining concentric inlet 121. The construction of FIG. 19 provides easier opening for smaller birds and includes a head 64 that includes a frusto-conical undersurface 124 to afford enhanced rocking or tilting in response to a laterally applied moving force. Also included is a localized internal enlargement 119 within tube 118 that functions to allow passing of large flow quantities without creating a squirting action. The latter, when it occurs, evades the birds and can cause messing to be incurred.

The valve construction of FIG. 18 is most suitable for smaller birds utilizing stem 117. A close fitting O-ring seal 126 tautly surrounds collar 122 to aid against collapse of the seal and is sandwiched between a flat head 128 of metering pin 56 and end face 120 of actuator stem 117. In this arrangement, pin 56 incurs a relatively reduced lift in response to the tilt angle incurred by stem 117. This feature affords the benefit of allowing more water to flow about the exterior of stem 117.

Figure 20:
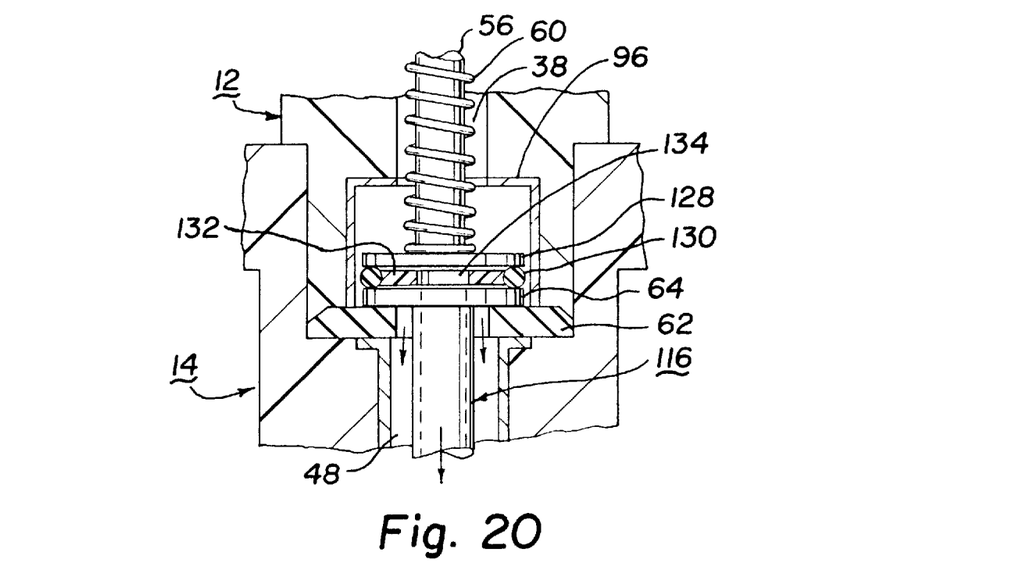
FIG. 20 is a fragmentary sectional elevation of a valve modified from the construction of FIG. 18.
Figure 21:
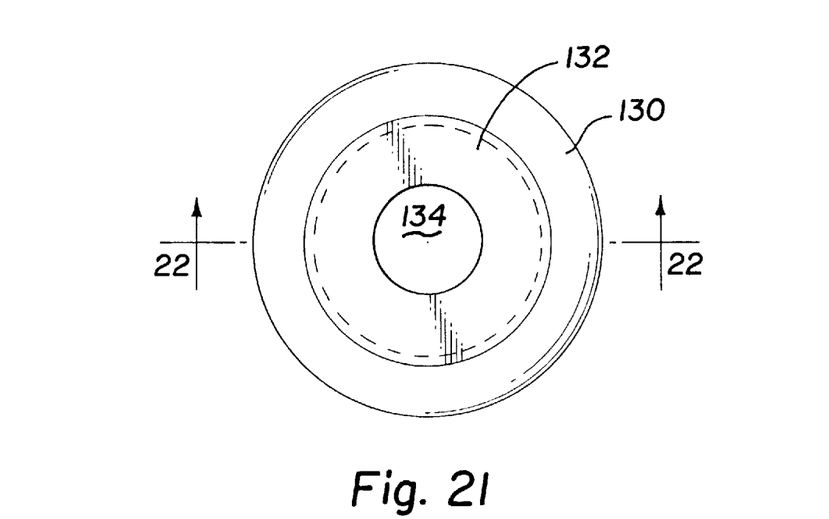
FIG. 21 is an enlarged plan view of the O-ring seal of FIG. 20.
Figure 22:
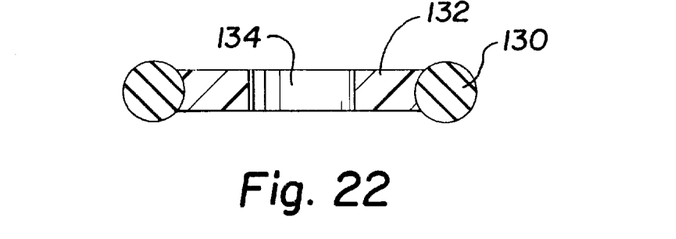
FIG. 22 is a sectional view taken substantially along the lines 22–22 of FIG. 21.

In the modification of FIGS. 20–22, an O-ring seal 130 is positioned at or just inside the common circumference of heads 64 and 128 and includes a floating center disc 132 having a concentric center bore 134. Bore 134 can be of a diameter slightly larger or smaller than the internal diameter of tube 118 and by comparison with the arrangement of FIG. 18, effects a maximum rise of pin 56 to allow maximum flow through and about actuator stem 116. Disc 132 maintains the diameter of O-ring 130 in that being of a substantially more rigid composition, the disc affords reinforcement for preventing O-ring collapse.

Figure 23:
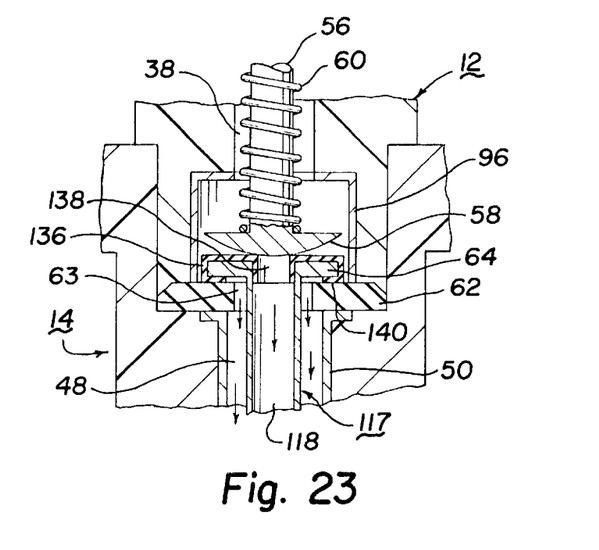
FIG. 23 is a fragmentary sectional elevation of a third embodiment dispensing valve hereof.

For the third embodiment of FIG. 23, stem head 64 is enclosed by a molded snap-on seal 136 that includes a center bore 138 of internal diameter slightly smaller than the diameter of tube 118. Being wrapped to below head 64, seal 136 functions both top and bottom by enabling underside portion 140 to afford a sealing relation thereat until rocked or displaced from the upper surface of seal 62. This construction likewise affords the benefit of easier opening for smaller birds.

Figure 24:
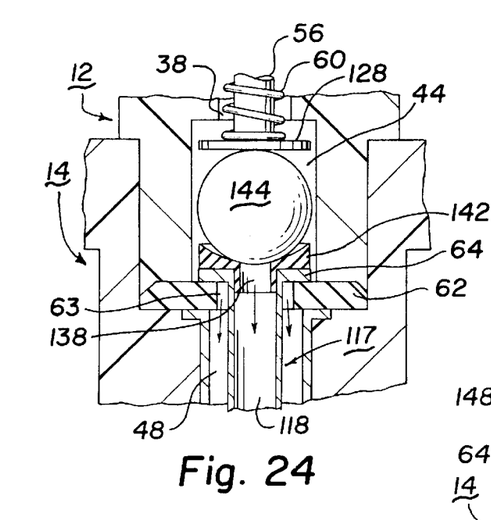
FIG. 24 is a fragmentary sectional elevation of a fourth embodiment dispensing valve hereof.

The fourth embodiment of FIG. 24 is most suitable for small flow requirements. Head 64 supports a cup-shaped semi-spherical seal 142 in which a spherical ball 144 of stainless steel, glass or plastic is received and sandwiched thereat by flat head 128 of metering pin 56. Spring 60 urges pin head 128 against ball 144 that in turn is urged against seal 142. Bore 138 is of a diameter smaller than that of tube 118. This construction permits relatively greater dual flow quantities about the exterior of stem 117.

Figure 25:
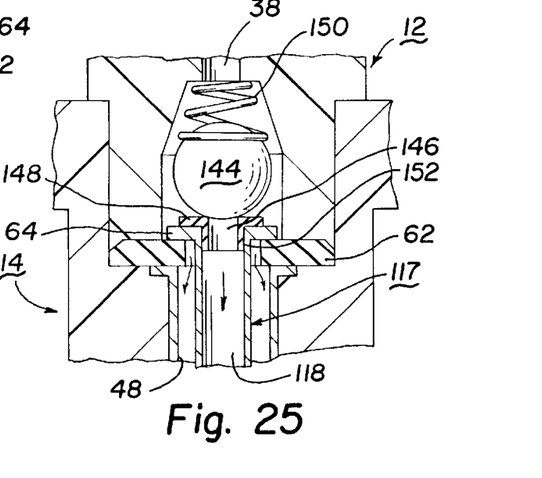
FIG. 25 is a modified valve form from the embodiment of FIG. 24.

The variation of FIG. 25 affords relatively high flow, utilizing ball 144 adapted to seat in the bore 146 of a T-shaped seal 148. The ball is urged toward a seating relation by a compressed frusto-conically configured spring 150 while bore 38 is devoid of a metering pin. This enables a high flow water supply 26 to be continuously maintained about ball 144 and is most suitable for larger birds such as breeder hens and turkeys. Neck 152 of seal 148 depends inwardly of tube 118 so as to afford a reduced diameter inlet thereat. Any tilting or rocking of stem 117 will cause displacement of ball 144 from bore 146 so as to permit dual water flow through and around actuator stem 117. As above, initial flow is conducted through tube 118 and in response to an increased demand, parallel dual flow is incurred beneath head 62 to through bore 48.

In addition to the foregoing benefits achieved by the novel construction hereof, color tests were conducted to ascertain birds preferred attractant for initiating or prompting use of the valves. The tests utilized tasteless and odorless colored seed beads (Creative Craft No. 8020) in each of five colors or M & M sugar candy (termed "skittles"). Pursuant to the above, the tests included placing the beads/skittles in an ice cube tray located in an accessible proximity to the birds and produced the following results:

| Age | Outlay | Consumption | Duration |
|---|---|---|---|
| BROILERS | | | |
| TEST 1 Seed Beads (prior comsumption of corn chops) | | | |
| 1 wk. & 1 day | 32 Yellow | 31 | 1½ hrs. |
| | 32 Blue | 22 | |
| | 32 Green | 26 | |
| | 32 Orange | 20 | |
| | 32 Red | 16 | |
| TEST 2 Seed Beads | | | |
| 3 wks. & 1 day | 30 Yellow | 13 | ½ hr. |
| | 30 Blue | 1 | |
| | 30 Green | 30 | |
| | 30 Orange | 12 | |
| | 30 Red | 14 | |
| TEST 3 Skittles | | | |
| 3 wks. & 4 days | 20 Yellow | 16 | 1 hr. |
| | 20 Purple | 12 | |
| | 20 Green | 20 | |
| | 20 Orange | 11 | |
| | 20 Red | 9 | |
| TEST 4 Seed Beads | | | |
| 4 wks. & 1 day | 50 Yellow | 36 | 3 hrs. |
| | 50 Blue | 28 | |
| | 50 Green | 40 | |
| | 50 Orange | 30 | |
| | 50 Red | 17 | |

From the above it is evident that the birds had a strong attractant preference to want, seek out and eat items with the color green. The same applies to the use of drinker valves, which when the color green is the color of choice, afford a stronger attraction to the drinker initiating young-chicks to drink quickly and often.

In operation, individual birds pecking or nudging against the exposed end of actuator stem 66 in the first embodiment will cause the stem to be angularly displaced in a rocking relation from its closed relation relative to pin 56 that is caused to be displaced upwardly. The extent of side displacement will be generally correlated to the level of force imposed such that the smaller chicks will effect lesser displacement than will the larger more mature birds. With each displacement, stem head 64 incurs up to a 360 degree rocking action which in turn forces metering pin 56 upward within saddle neck 26. As water enters past pin 56 into bore 38 it flows out past the metering pin through aperture 63 of gasket 62 and into sleeve 50.

With essentially gravity flow and taking the path of least resistance, the water is caused to enter cross bore 70 and aperture 72, to then flow downward within tube 74 until discharging through outlet 76. On further or increased offset of the actuator stem, the opening beneath head 64 is increased enabling a greater flow of water through opening 63 to cross bore 70 and aperture 72. When the quantity of flow entering sleeve 50 exceeds the capacity of stem bore 70 and aperture 72 to accommodate the flow, excess flow is caused to spill downward concomitantly and in parallel along the exterior surface of stem 66. In this manner, a larger bird imposing a greater demand force on the stem will receive larger amounts of catchable water with dual flow than will the chick that effects only a minimal displacement thereof. This can be further enhanced, for example, by use of the metering pin 56 as illustrated in FIGS. 13 or 14. As the pin rises in response to the rocking motion of the actuator stem, a larger flow area and therefore a larger flow is afforded by virtue of the reduced diameter section 98 or the splines 106.

For those embodiments having a continuous stem tube 118, displacement of actuator stem 116 or 117 will first permit water to enter the tube at the top opening 121. Further displacement of the stem will permit additional water quantities to flow concomitantly intervening between the underside of the stem head and seal thereat such that parallel flow is achieved with flow both internally and externally of the tube. A similar result is a obtained where the metering pin head is replaced or displaced by a spring biased ball.

By the above description there is disclosed a novel dispensing valve for demand watering of birds and small animals. Utilizing a novel construction, such valves accommodate a variation in water demands as is typically encountered between smaller and larger birds and/or small animals. Yet, the device is economical both to fabricate and install while achieving the foregoing variants to effect ultimate savings in operation. The virtues therefore are many and will be readily appreciated by those skilled in the art.

Since many changes could be made in the above construction and many apparently widely different embodiments of this invention could be made without departing from the scope thereof, it is intended that all matter contained in the drawings and specification shall be interpreted as illustrative and not in a limiting sense.

I claim:

1. A valve for dispensing water on demand of a bird or animal and comprising:

a tubular body at least the exterior of which is of an attractive color green and is adapted to be supported in a leak tight relation to a supply source of water at a predetermined value of pressure, said body defining a central passage having an inlet for receipt of water from the supply source and an outlet for controllably discharging water passed from said inlet;

a displaceable metering pin in the inlet passage of said body;

a tubular actuator stem in the outlet passage of said body and extending from a first end in operable engagement with an end of said metering pin to a distal outlet end beyond said body for operating access by an individual bird or animal to be watered; and spring means in said passage urging said metering pin toward said operable engagement with the first end of said actuator stem to normally maintain said passage closed to water flow and responsive to an applied force imposed by birds or animals against the distal end of said actuator stem to permit an upward rocking displacement of said first end while opening said passage to water flow.

2. A valve in accordance with claim 1 in which said spring means is contained in a compressed relation and comprises an extended coil spring having a relatively different coil size at its midsection than at its ends.

3. A valve in accordance with claim 2 in which the midsection coil size of said spring is larger than at its ends.

4. A valve in accordance with claim 3 in which the midsection coil size of said spring is smaller than at its ends.

5. A valve in accordance with claim 1 in which said actuator stem is comprised of an elongated continuously slotted ring key and a screw/rivet secured in its first end for engagement with said metering pin.

6. A valve for dispensing water on demand of a bird or animal and comprising:

a tubular body adapted to be supported in a leak tight relation to a supply source of water at a predetermined value of pressure, said body defining a central passage having an inlet for receipt of water from the supply source and an outlet for controllably discharging water passed from said inlet;

said body being of plastic composition comprised of an upper and lower section secured interfitted together;

the central passage portion of said lower section having a metal liner for protecting said passage portion against wear by said actuator stem with said liner extending to a distal end emanating from a location above the end face of the body surrounding said passage portion to a location at least partially below the end face of the body surrounding said passage;

a displaceable metering pin in the inlet passage of said body;

a tubular actuator stem in the outlet passage of said body and extending from a first end in operable engagement with an end of said metering pin to a distal outlet end beyond said body for operating access by an individual bird or animal to be watered;

spring means in said passage urging said metering pin toward said operable engagement with the first end of said actuator stem to normally maintain said passage closed to water flow and responsive to an applied force imposed by birds or animals against the distal end of said actuator stem to permit an upward rocking displacement of said first end while opening said passage to water flow; and parallel flow paths defined in relation to said actuator stem and operative to accommodate varying quantities of water flow in said open passage in correlation to the level of applied force imposed by individual birds or animals.

7. A valve in accordance with claim 6 in which said liner is knurled or splined at least partially about its outer surface.

8. A valve in accordance with claim 6 including support means engaging the distal end of said liner to maintain said liner against fall off or pull off.

9. A valve in accordance with claim 6 in which said liner includes a gripping surface about its exterior for enhancing securement of said liner to the surface of said central passage.

10. A valve in accordance with claim 6 including a protective guard cap secured to the underend of said body having an aperture coaxially positioned opposite the distal end of said passage.

11. A valve for dispensing water on demand of birds and animals and comprising:

a tubular body adapted to be supported in a leak tight relation to a supply source of water at a predetermined value of pressure, said body defining a central passage having an inlet for receipt of water from the supply source and an outlet for discharging water passed from said inlet;

a displaceable metering pin in the inlet passage of said body;

an actuator stem in the outlet passage of said body and extending from a first end in an engaging relation with an end of said metering pin to a distal outlet end beyond said body for operating access by individual birds or animals to be watered;

spring means in said passage urging said metering pin toward said engaging relation with the first end of said actuator stem to normally maintain said passage closed to water flow and responsive to an applied force imposed by birds or animals against the distal end of said actuator stem to permit an upward rocking displacement of said first end while opening said passage to water flow; and a buffer ring supported on said actuator in the vicinity of said distal end for receipt of an applied force imposed by individual birds or animals.

12. A valve for dispensing water on demand of a bird or animal and comprising:

a tubular body adapted to be supported in a leak tight relation to a supply source of water at a predetermined value of pressure, said body defining a central passage having an inlet for receipt of water from the supply source and an outlet for controllably discharging water passed from said inlet;

a displaceable metering pin in the inlet passage of said body;

a tubular actuator stem in the outlet passage of said body and extending from a first end in operable engagement with an end of said metering pin to a distal outlet end beyond said body for operating access by an individual bird or animal to be watered;

spring means in said passage urging said metering pin toward said operable engagement with the first end of said actuator stem to normally maintain said passage closed to water flow and responsive to an applied force imposed by birds or animals against the distal end of said actuator stem to permit an upward rocking displacement of said first end while opening said passage to water flow; and parallel flow paths defined in relation to said actuator stem and operative to accommodate varying quantities of water flow in said open passage in correlation to the level of applied force imposed by individual birds or animals;

said tubular stem including an internally central flow passage comprising one of said parallel flow paths communicating with said outlet and having apertures of selectively controlled size for communicating limited flow quantities from outward to inward of said stem passage to discharge the flow through the outlet end of said actuator stem.

13. A valve in accordance with claim 12 in which the second of said parallel flow paths is incurred in response to a flow rate exceeding the flow limits imposed by said apertures to concomitantly permit excess flow to discharge in a parallel relation to the one of said flow paths along the exterior of said stem and through the outlet of said body.

14. A valve in accordance with claim 13 including a buffer ring supported on said actuator stem at least partially within the outlet of said body for receipt of an applied force imposed by individual birds or animals.

15. A valve in accordance with claim 14 in which said buffer ring comprises a tinnerman nut.

16. A valve in accordance with claim 14 in which said buffer ring is arcuately displaceable relative to said stem to receive and dissipate any twisting force imposed by individual birds or animals and there is provided means effective at the distal end of said stem to prevent fall-off or pull off of said buffer ring.

17. A valve in accordance with claim 16 in which said buffer ring is of sufficient thickness to trap a quantity of the excess water flow above its upper end face when said actuator stem is restored from its open to its closed relation by said spring means.

18. A valve in accordance with claim 12 in which a partial length of said metering pin is of reduced diameter relative to the remaining length of said metering pin.

19. A valve in accordance with claim 18 in which the reduced length portion of said metering pin is at an intermediate location on said pin and there is included a frusto-conical taper at the inlet joinder of said remaining length to said reduced length diameter.

20. A valve in accordance with claim 19 in which said frusto-conical taper is of a first angle for watering of small birds and a second angle for watering relatively larger birds and animals.

21. A valve for dispensing water on demand of a bird or animal and comprising:

a tubular body adapted to be supported in a leak tight relation to a supply source of water at a predetermined value of pressure, said body defining a central passage having an inlet for receipt of water from the supply source and an outlet for controllably discharging water passed from said inlet;

a displaceable metering pin in the inlet passage of said body;

a tubular actuator stem in the outlet passage of said body and extending from a first end in operable engagement with an end of said metering pin to a distal outlet end beyond said body for operating access by an individual bird or animal to be watered;

said tubular actuator stem including a cross head at said first end and a central flow passage extending from an inlet opening in said cross head to an outlet at said distal outlet end;

spring means in said passage urging said metering pin toward said operable engagement with the first end of said actuator stem to normally maintain said passage closed to water flow and responsive to an applied force imposed by birds or animals against the distal end of said actuator stem to permit an upward rocking displacement of said first end while opening said passage to water flow; and parallel flow paths defined in relation to said actuator stem and operative to accommodate varying quantities of water flow in said open passage in correlation to the level of applied force imposed by individual birds or animals.

22. A valve in accordance with claim 21 in which there is included an annular collar secured onto said cross head concentrically about the inlet opening to the central flow passage of said actuator stem.

23. A valve in accordance with claim 22 in which said cross head has an undersurface having a frusto-conical configuration.

24. A valve in accordance with claim 22 including an annular seal surrounding said collar for maintaining a sealed relation between said metering pin and the cross head of said actuator stem in the absence of an applied force being imposed.

25. A valve in accordance with claim 21 including a displaceable sphere positioned intervening between said metering pin and the cross head of said actuator stem for effecting said operable engagement therebetween.

26. A valve in accordance with claim 25 in which a seal is supported on said cross head and said seal has an upper surface configured to receive said sphere.

* * * * *